US012783061B2

(12) United States Patent
Lee

(10) Patent No.: US 12,783,061 B2
(45) Date of Patent: Nov. 3, 2026

(54) BUTTON STRUCTURE

(71) Applicant: CHENG UEI PRECISION INDUSTRY CO., LTD., New Taipei City (TW)

(72) Inventor: Tsung-Shih Lee, New Taipei City (TW)

(73) Assignee: CHENG UEI PRECISION INDUSTRY CO., LTD., New Taipei City (TW)

( * ) Notice: Subject to any disclaimer, the term of this patent is extended or adjusted under 35 U.S.C. 154(b) by 124 days.

(21) Appl. No.: 19/004,206

(22) Filed: Dec. 27, 2024

(65) Prior Publication Data

US 2025/0383721 A1 Dec. 18, 2025

(30) Foreign Application Priority Data

Jun. 14, 2024 (CN) ......................... 202421371603.8

(51) Int. Cl.
*G06F 3/02* (2006.01)
*A63F 13/20* (2014.01)

(52) U.S. Cl.
CPC ............ *G06F 3/0202* (2013.01); *A63F 13/20* (2014.09)

(58) Field of Classification Search
None
See application file for complete search history.

(56) References Cited

U.S. PATENT DOCUMENTS

| | | | | |
|---|---|---|---|---|
| 7,960,665 | B2 * | 6/2011 | Sakai | H01H 25/00 200/345 |
| 2007/0060291 | A1 * | 3/2007 | Cole | G07F 17/32 463/20 |
| 2025/0068260 | A1 * | 2/2025 | Morita | G06F 3/02 |
| 2025/0381473 | A1 * | 12/2025 | Lee | A63F 13/285 |

* cited by examiner

*Primary Examiner* — Junior O Mendoza
(74) *Attorney, Agent, or Firm* — Cheng-Ju Chiang

(57) ABSTRACT

A button structure includes a push button, a supporting unit mounted inside the push button, and a circuit board. The supporting unit has a main body. Two opposite sides of the main body extend outward to form two side arms. The main body extends downward to form a fixing rod. A front and a rear of a lower portion of an outer surface of the fixing rod protrude outward to form two buckling hooks. The push button is disposed on an upper surface of the circuit board. The circuit board has a through hole penetrating through the upper surface and a lower surface of the circuit board. The fixing rod passes through the through hole. The two buckling hooks are buckled to the lower surface of the circuit board. The circuit board is fastened among the main body, the two side arms and the two buckling hooks.

11 Claims, 11 Drawing Sheets

BUTTON STRUCTURE

CROSS REFERENCE TO RELATED APPLICATIONS

The present application is based on, and claims priority from, China Patent Application No. 202421371603.8, filed Jun. 14, 2024, the disclosure of which is hereby incorporated by reference herein in its entirety.

BACKGROUND OF THE INVENTION

Field of the Invention

The present invention generally relates to a button structure, and more particularly to a button structure that is stably assembled and is applied to a game controller.

Description of Related Art

A directional pad (D-pad) belongs to a standard component of a game controller. Most of the game controllers are equipped with the D-pads. The D-pad includes four push buttons with different functions, and the D-pad is used for moving in four directions which are an upward direction, a downward direction, a leftward direction and a rightward direction.

Currently, a bottom of the D-pad of the game controller is equipped with a supporting column. The supporting column is fixed to a circuit board for realizing a location between the D-pad and the circuit board, and a fixation between the D-pad and the circuit board.

However, the supporting column just abuts against a top surface of the circuit board to be fixed to the circuit board, and tolerances between the supporting column and the circuit board are existed, so that the D-pad still wobbles after the D-pad is assembled.

Therefore, it is necessary to provide an innovative button structure that is stably assembled and is applied to the game controller.

BRIEF SUMMARY OF THE INVENTION

An object of the present invention is to provide a button structure that is stably assembled and is applied to a game controller. The button structure includes a push button, a supporting unit and a circuit board. The push button has a top wall. A middle of a bottom surface of the top wall of the push button protrudes downward to form a protruding column. The supporting unit is mounted inside the push button. The supporting unit has a main body, a fixing rod, two side arms and a positioning groove. The main body is a hollow columnar structure. Two opposite sides of the main body extend outward to form the two side arms. A middle of the main body extends downward to form the fixing rod. The fixing rod extends beyond a bottom surface of the main body. A front and a rear of a lower portion of an outer surface of the fixing rod protrude outward to form two buckling hooks. A middle of a top surface of the main body is recessed downward to form a positioning groove. The protruding column is positioned in the positioning groove. The push button is disposed on an upper surface of the circuit board. A bottom surface of the main body is positioned on the upper surface of the circuit board. Two bottom surfaces of the two side arms are positioned on the upper surface of the circuit board. The circuit board has a through hole penetrating through the upper surface and a lower surface of the circuit board. The fixing rod passes through the through hole. The two buckling hooks are buckled to the lower surface of the circuit board. The circuit board is fastened among the bottom surface of the main body, the bottom surfaces of the two side arms and top surfaces of the two buckling hooks.

Another object of the present invention is to provide a button structure. The button structure includes a push button, a supporting unit mounted inside the push button, and a circuit board. An inside of the supporting unit forms an inner space that penetrates through a lower surface of the supporting unit. The supporting unit has a top part, two side walls extended downward from two opposite sides of the top part, two connection walls, a fixing rod and two side arms. The two connection walls are arranged between the two side walls, and the two connection walls are connected between the two side walls. The inner space is enclosed by the top part, the two side walls and the two connection walls. The fixing rod is extended downward from a middle of a bottom surface of the top part. The fixing rod extends downward to project out of the inner space. A front and a rear of a lower portion of an outer surface of the fixing rod protrude outward to form two buckling hooks. The two side arms are extended outward from two middles of two outer surfaces of the two side walls, respectively. Each side arm has an extension arm, a bending arm, a fixing end and a positioning bump. The middle of the outer surface of each side wall horizontally extends outward to form the extension arm. An outer end of the extension arm is bent downward to form the bending arm. A lower end of the bending arm horizontally extends outward to form the fixing end. An upper portion of the fixing end is recessed downward to form a positioning bump protruding beyond a bottom surface of the fixing end. The top part is mounted to an upper surface of the circuit board. The push button, the two side walls, the two connection walls and the two side arms are positioned on the upper surface of the circuit board. The circuit board has a through hole penetrating through the upper surface and a lower surface of the circuit board. The circuit board has two positioning holes penetrating through the upper surface and the lower surface of the circuit board. The through hole is located between the two positioning holes. The fixing rod passes through the through hole. The two buckling hooks are buckled to the lower surface of the circuit board. The circuit board is fastened among bottom surfaces of the two side walls, bottom surfaces of the two side arms and top surfaces of the two buckling hooks. The two positioning bumps of the two side arms are positioned in the two positioning holes.

Another object of the present invention is to provide a button structure. The button structure includes a push button, a supporting unit mounted inside the push button, and a circuit board. An inside of the supporting unit forms an inner space that penetrates through a lower surface of the supporting unit. The supporting unit has a top part, two side walls extended downward from two opposite sides of the top part, two connection walls, a fixing portion, two first extension portions, two buckling hooks and two side arms. The two connection walls are arranged between the two side walls, and the two connection walls are connected between the two side walls. The fixing portion is extended downward from a bottom surface of the top part. The two first extension portions are extended downward from a bottom surface of the fixing portion. The two first extension portions are separated from each other. Bottoms of the two first extension portions project out of the inner space. The two buckling hooks are extended outward from outer surfaces of the bottoms of the two first extension portions. The two side arms are extended outward from two outer surfaces of the two side walls, respectively. The top part is mounted to an upper surface of the circuit board. The push button, the two side walls, the two connection walls and the two side arms are positioned on the upper surface of the circuit board. The circuit board has a through hole penetrating through the upper surface and a lower surface of the circuit board. The bottoms of the two first extension portions pass through the through hole. The two buckling hooks pass through the through hole. The two buckling hooks are buckled to the lower surface of the circuit board. The circuit board is fastened among bottom surfaces of the two side walls, bottom surfaces of the two side arms and top surfaces of the two buckling hooks.

As described above, the main body is positioned on the upper surface of the circuit board, the two first extension portions and two second extension portions pass through the through hole, the two buckling hooks pass through the through hole, the two buckling hooks are buckled to the lower surface of the circuit board, the two positioning bumps of the two side arms are positioned in the two positioning holes, and the circuit board is fastened among the bottom surfaces of the two side walls of the main body, the bottom surfaces of the two side arms and the top surfaces of the two buckling hooks, so the button structure prevents the circuit board from shaking. Furthermore, the two side walls of the main body are symmetrical, the two connection walls of the main body are symmetrical, two openings of the main body are symmetrical, the two first extension portions of the fixing rod are symmetrical, the two second extension portions of the fixing rod are symmetrical, and the two side arms are symmetrical to facilitate an automatic assembling operation. In addition, a hollow area is formed among the two extension arms and a connection arm of each side wall of the main body, and the two hollow areas of the main body enhances an elasticity of the two side arms to facilitate a manual assembling operation. As a result, the button structure is conveniently assembled automatically and manually, and the button structure is stably assembled and is applied to a game controller.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
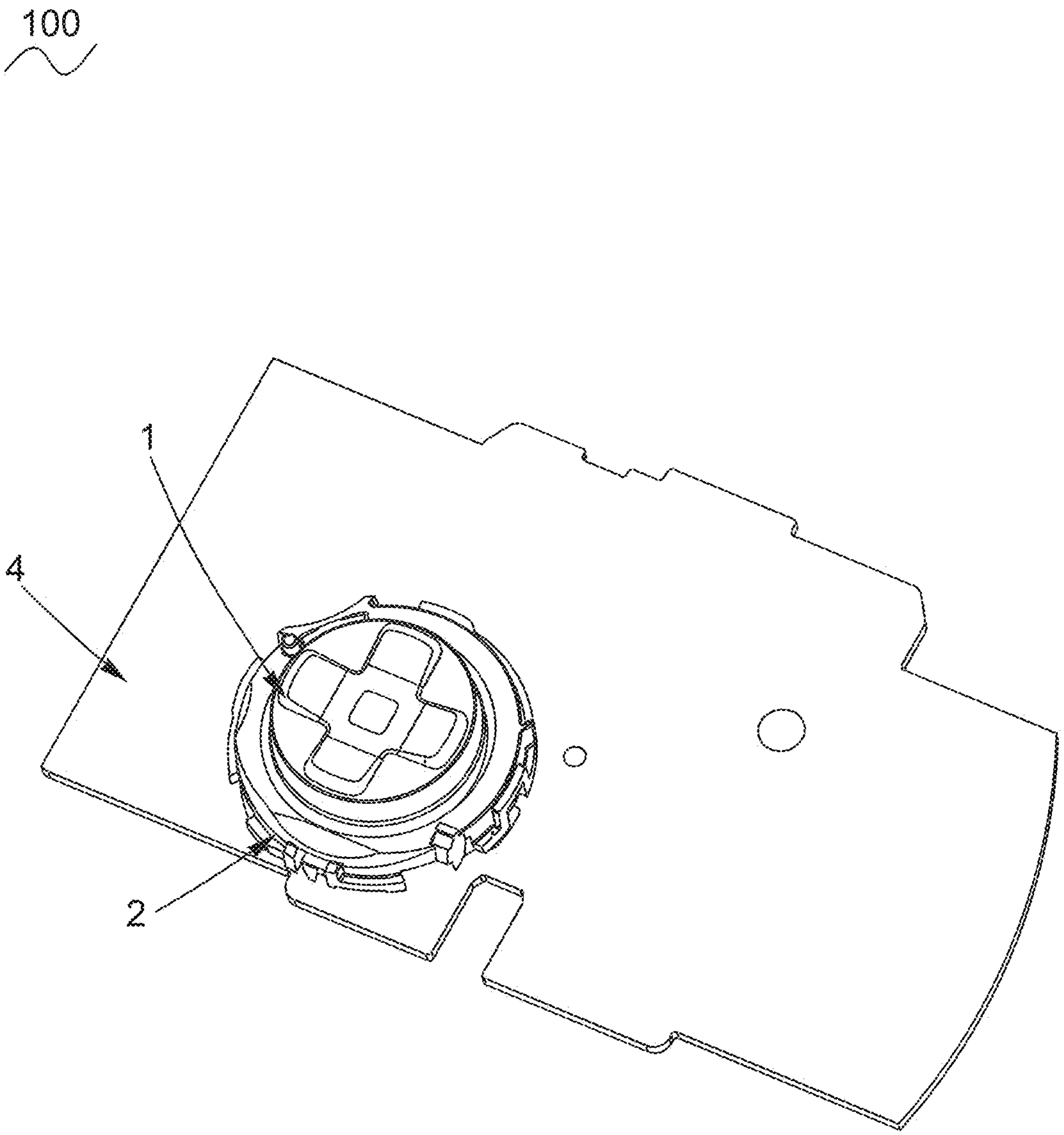
FIG. 1 is a perspective view of a button structure according to the present invention.
Figure 2:
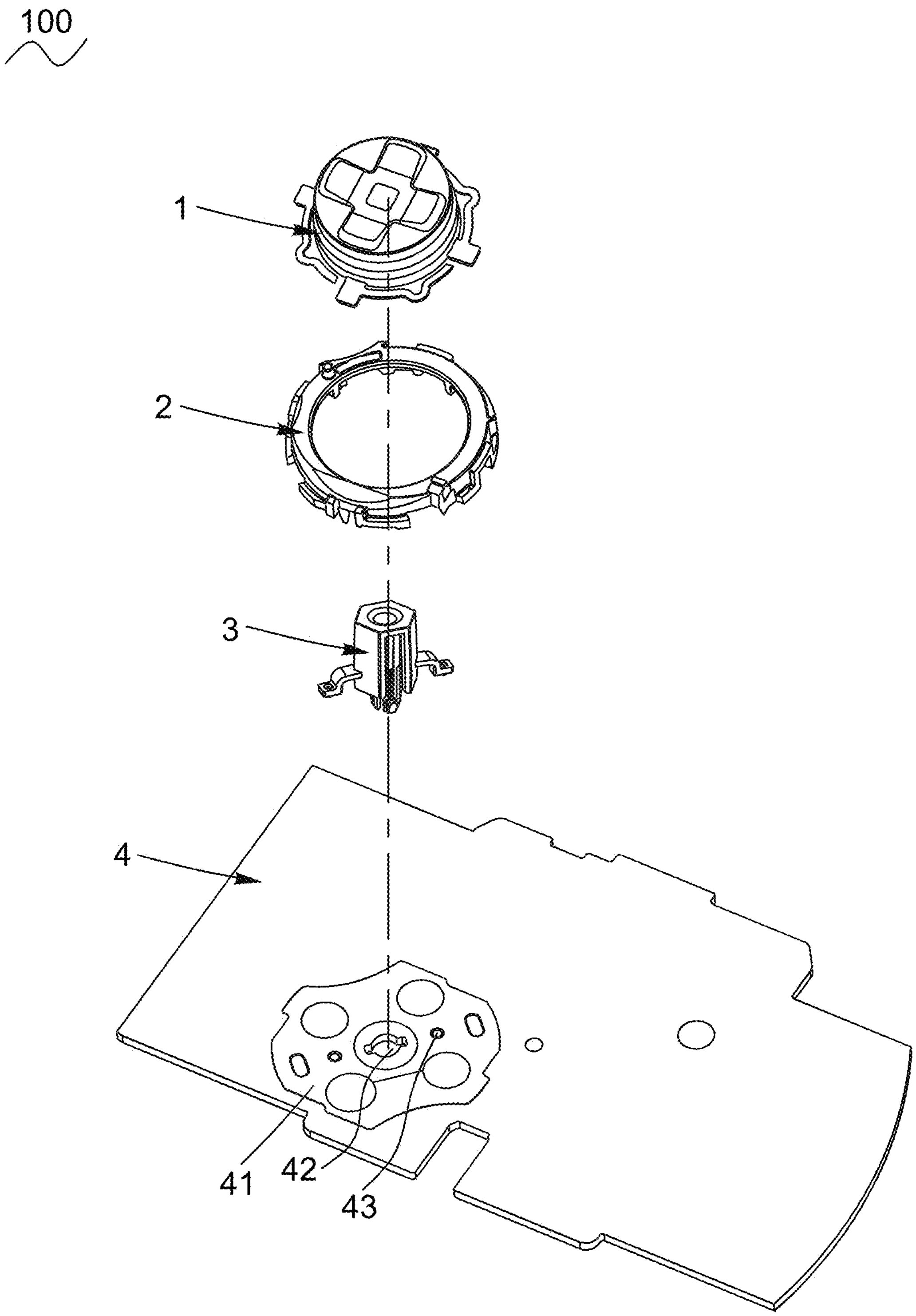
FIG. 2 is an exploded view of the button structure according to the present invention.
Figure 3:
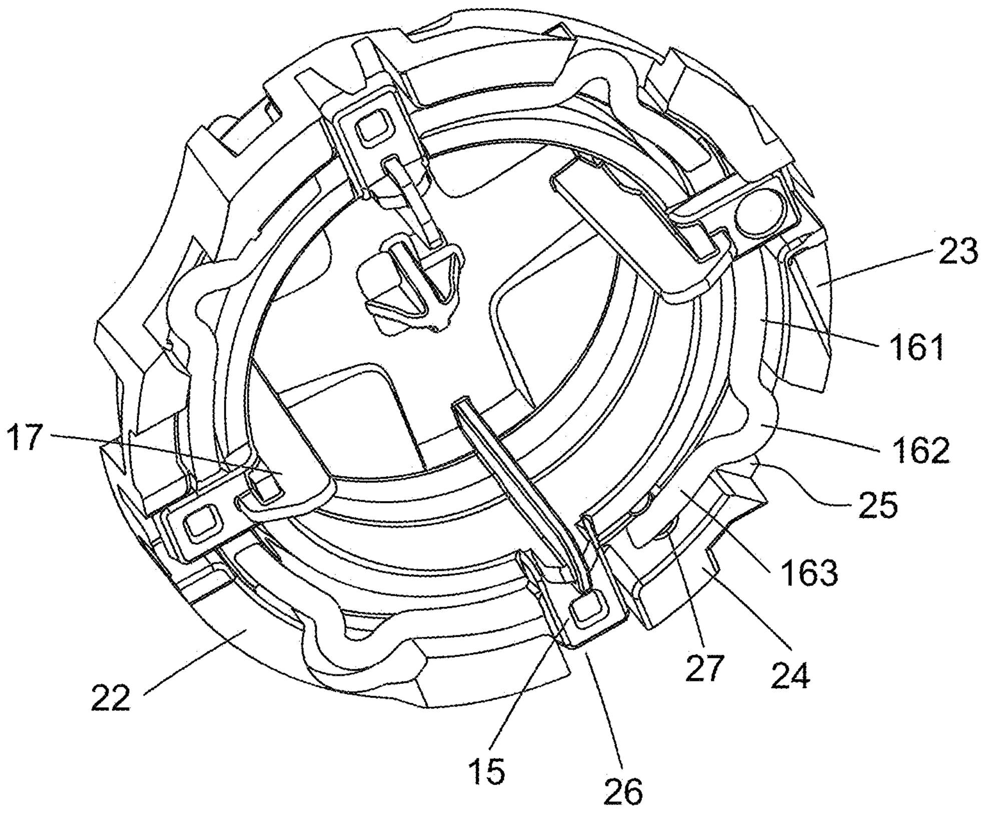
FIG. 3 is a partial perspective view of the button structure according to the present invention.
Figure 4:
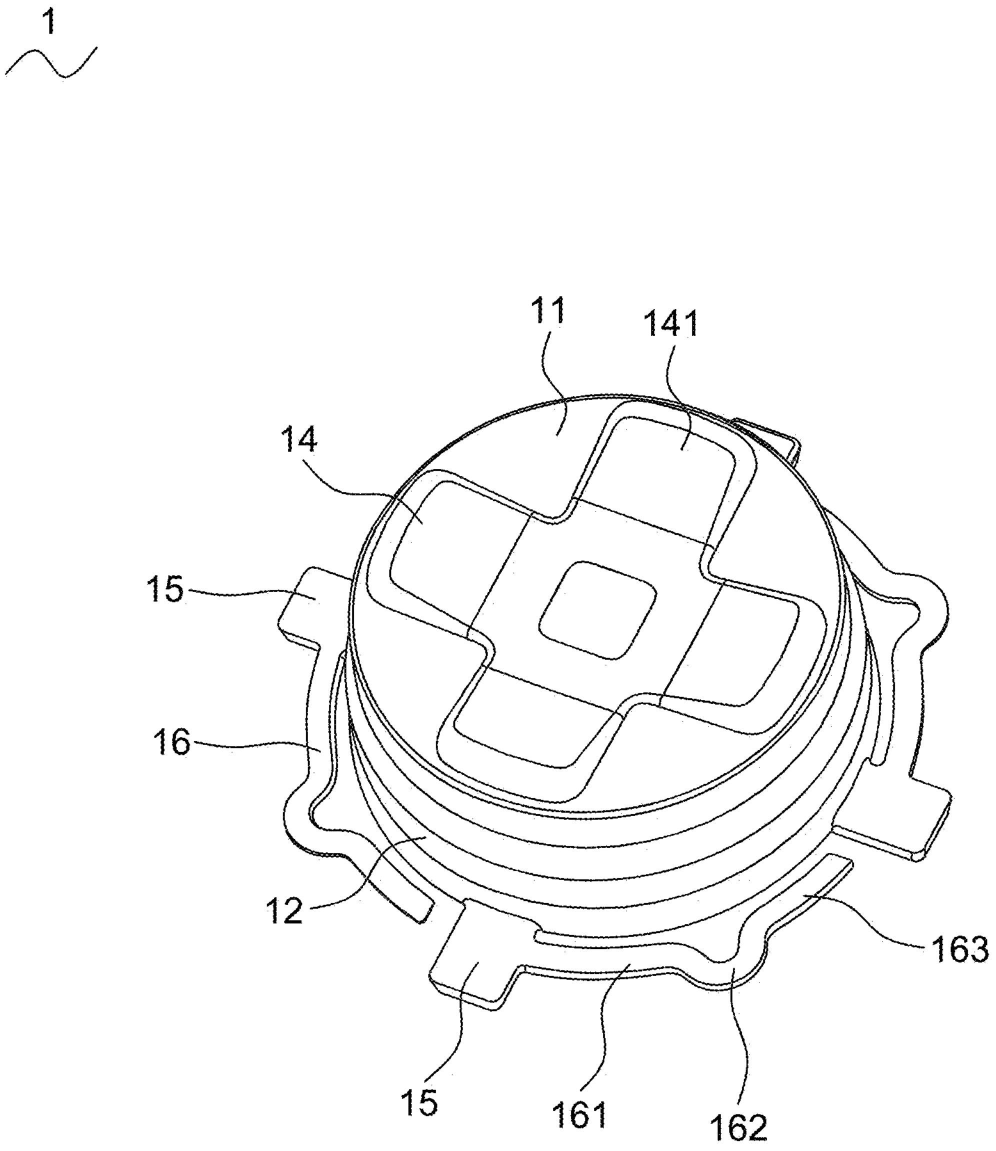
FIG. 4 is a perspective view of a push button of the button structure according to the present invention.
Figure 5:
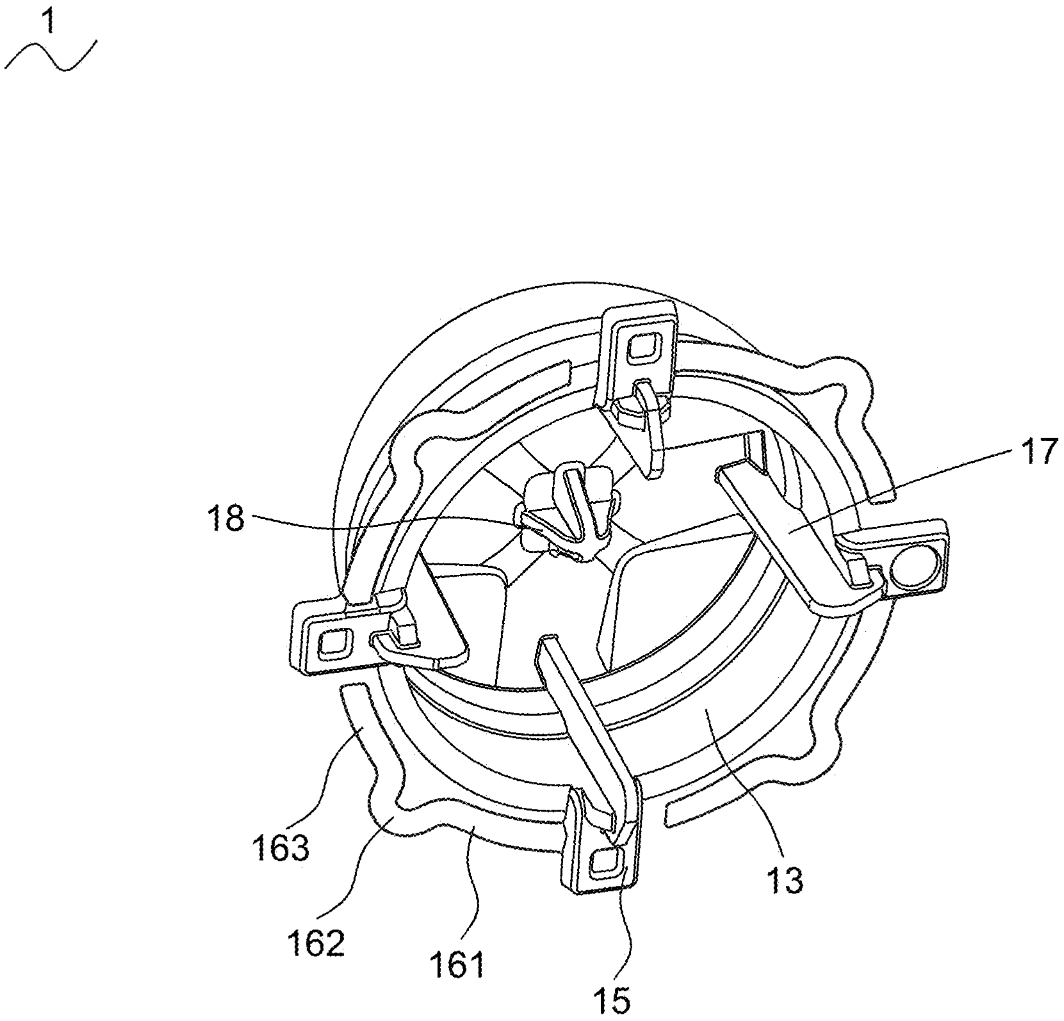
FIG. 5 is another perspective view of the push button of the button structure according to the present invention.
Figure 6:
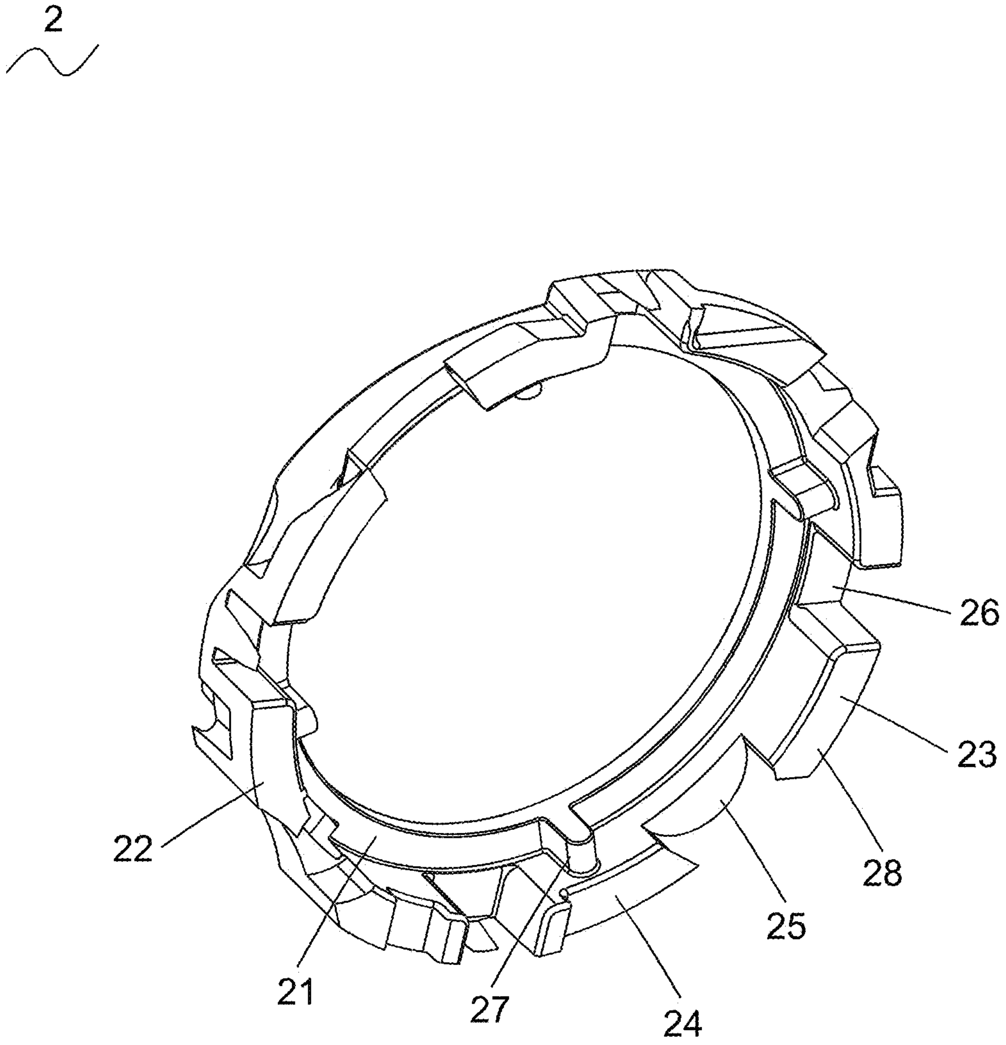
FIG. 6 is a perspective view of a housing of the button structure according to the present invention.
Figure 7:
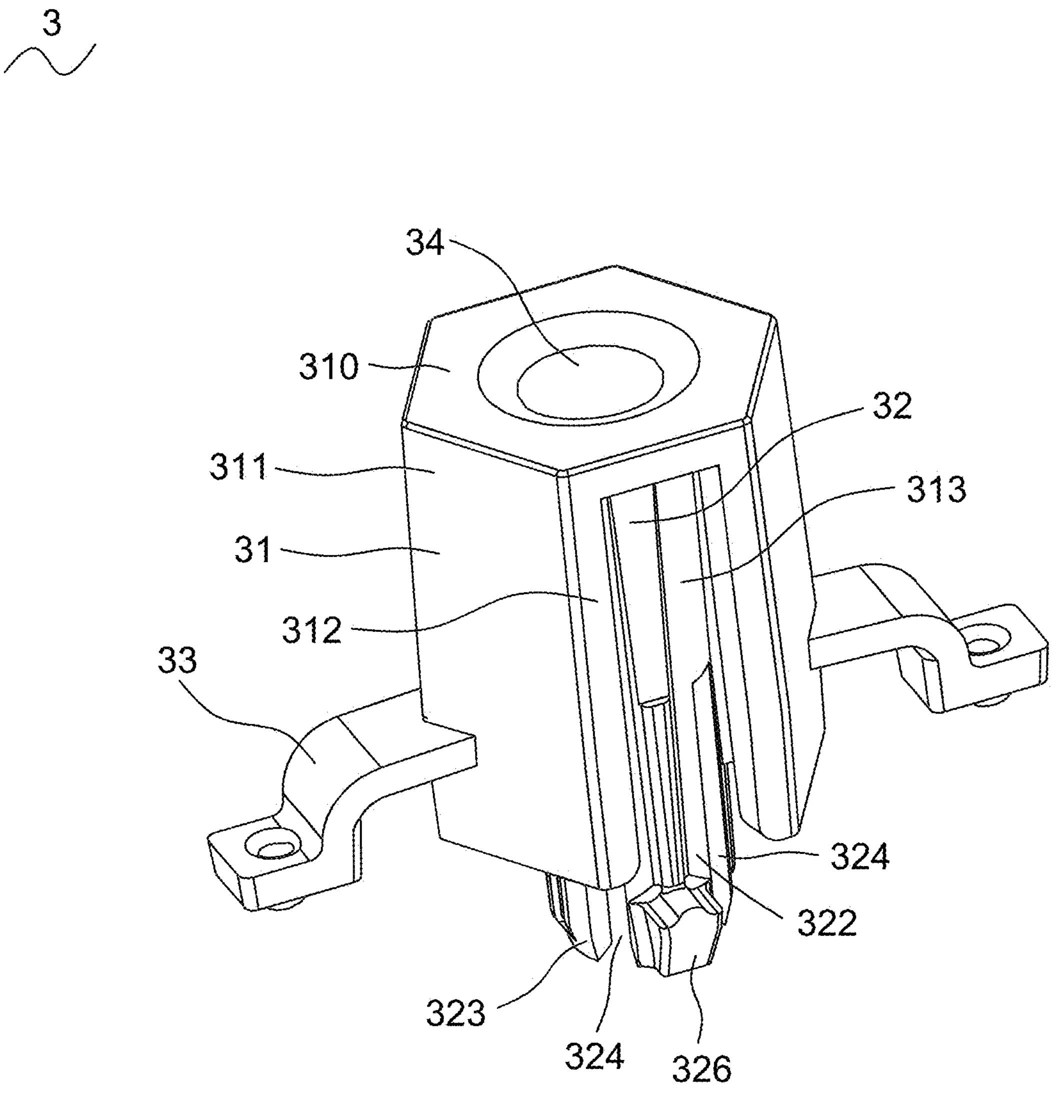
FIG. 7 is a perspective view of a supporting unit of the button structure in accordance with a first preferred embodiment of the present invention.
Figure 8:
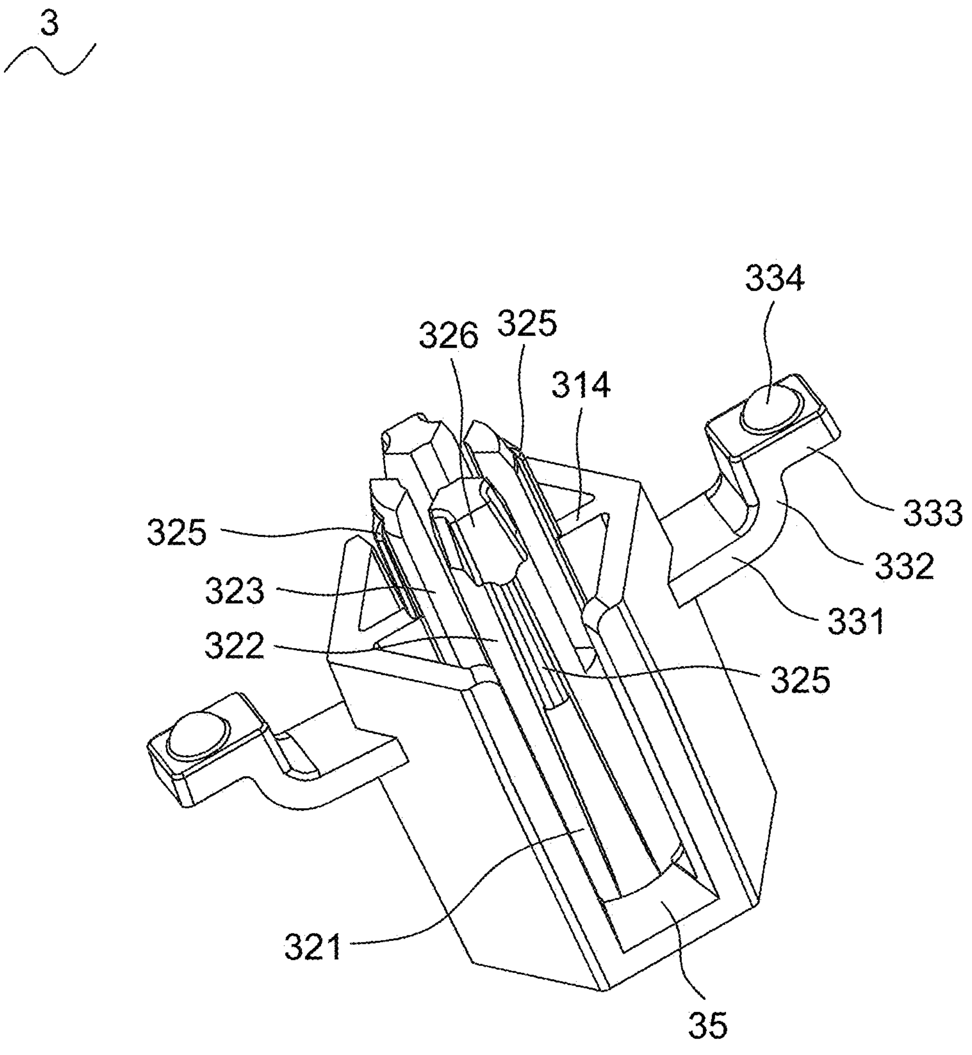
FIG. 8 is another perspective view of the supporting unit of the button structure according to the first preferred embodiment of the present invention.
Figure 9:
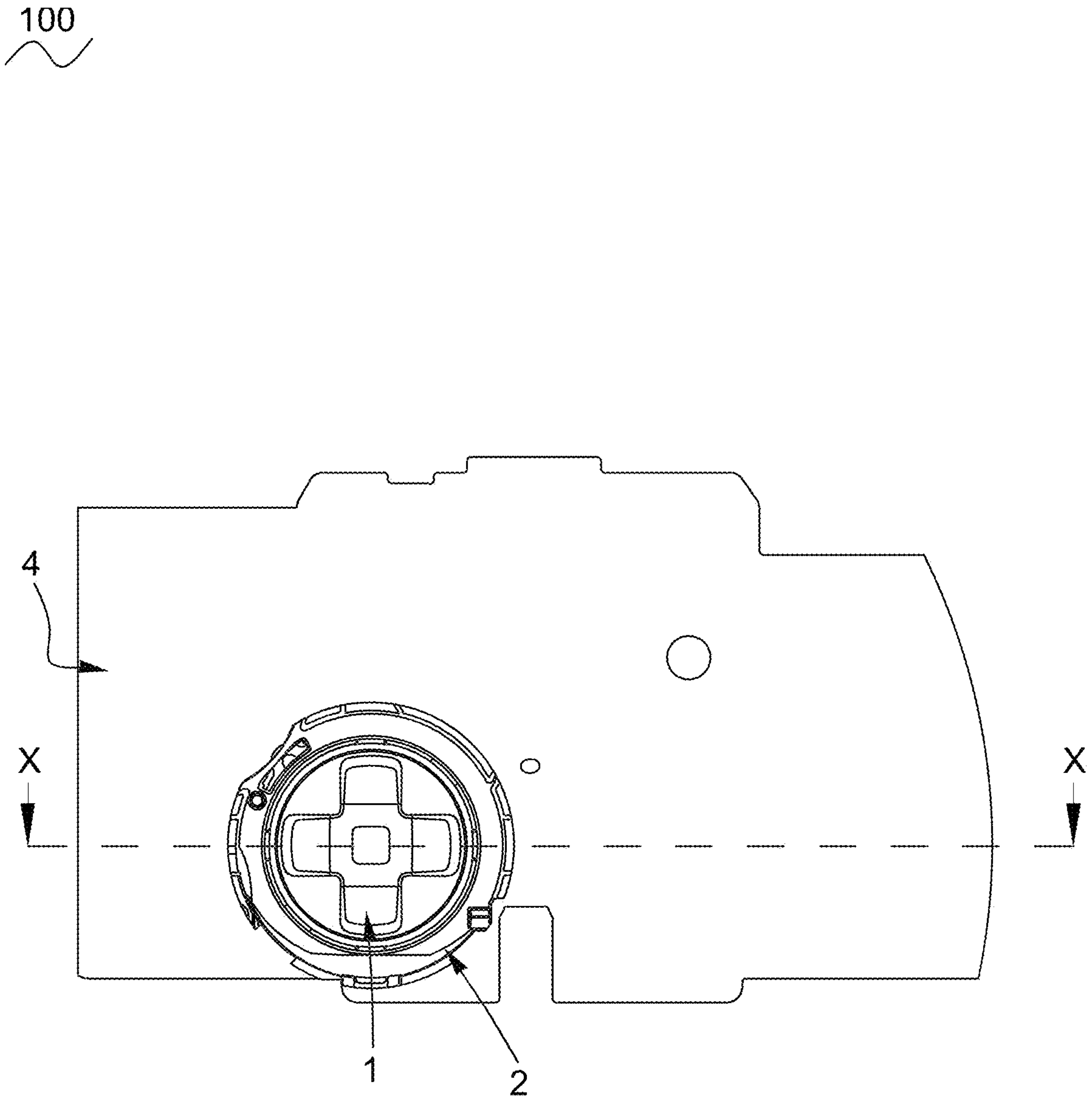
FIG. 9 is a schematic diagram of the button structure according to the present invention.
Figure 10:
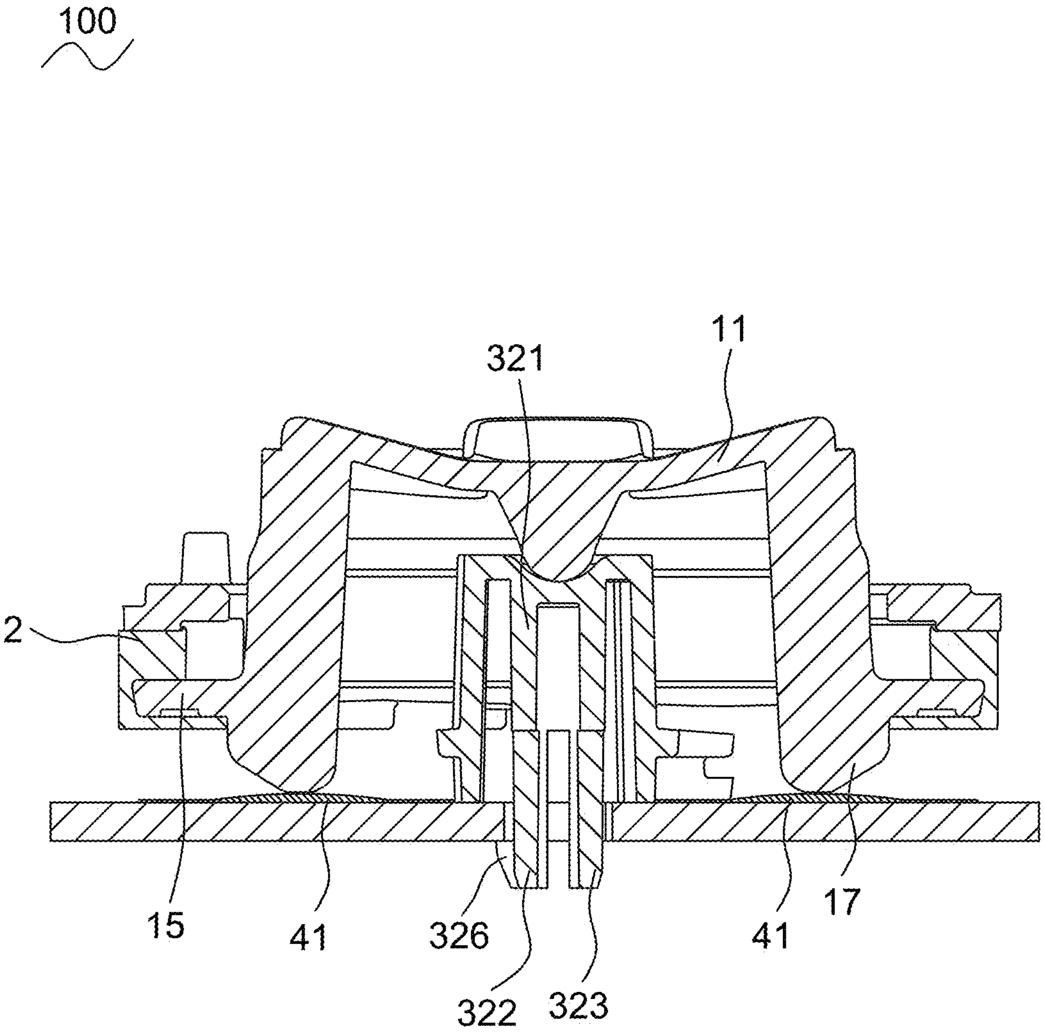
FIG. 10 is a cross-sectional view of the button structure along a line X-X of FIG. 9.

Referring to FIG. 1 and FIG. 2, a button structure 100 in accordance with the present invention is shown. The button structure 100 includes a push button 1, a housing 2, a supporting unit 3 and a circuit board 4. The push button 1 is disposed on an upper surface of the circuit board 4. The housing 2 is disposed on the upper surface of the circuit board 4 for enclosing the push button 1. The supporting unit 3 is mounted inside the push button 1. The supporting unit 3 partially passes through the circuit board 4, and the supporting unit 3 is fixed to the circuit board 4.

Referring to FIG. 3 to FIG. 6, the push button 1 has a top wall 11, an outer wall 12, an inner wall 13, a directional pad 14, a plurality of projection parts 15, a plurality of elastic arms 16, a plurality of connection sections 17, and a protruding column 18. The directional pad 14 is formed on a top surface of the top wall 11 of the push button 1. A middle of a bottom surface of the top wall 11 of the push button 1 protrudes downward to form the protruding column 18. The protruding column 18 is disposed in a corresponding mechanism of the supporting unit 3. The directional pad 14 has four pressing areas 141 in four directions, respectively. The directional pad 14 is shown as a cross shape.

Several portions of a bottom of the outer wall 12 of the push button 1 extend outward to form the plurality of the projection parts 15. The plurality of the projection parts 15 are evenly distributed around the outer wall 12 of the push button 1. Each projection part 15 extends along a radial direction of the outer wall 12 of the push button 1. The plurality of the projection parts 15 are positioned in a corresponding mechanism of the housing 2. Specifically, the push button 1 has four projection parts 15. The four projection parts 15 are arranged corresponding to the directional pad (D-pad) 14. The four projection parts 15 are corresponding to the four pressing areas 141 of the directional pad 14. The plurality of the projection parts 15 are also arranged corresponding to a metal button 41 arranged on the circuit board 4. One side of each projection part 15 extends outward and along a circumferential direction of the push button 1 to form the elastic arm 16. A middle of the elastic arm 16 is arched outward. The clastic arm 16 extends around a periphery of the push button 1. The elastic arm 16 is used to provide a tactile feedback for a user. The elastic arm 16 is used to provide a better pressing hand feeling for the user. In the present invention, the circuit board 4 is closer to the plurality of the projection parts 15 than to the plurality of the clastic arms 16.

The elastic arm 16 has a first arc portion 161, a bending portion 162 and a second arc portion 163. The one side of each projection part 15 extends outward and along the circumferential direction of the push button 1 to form the first arc portion 161. One end of the first arc portion 161 is bent outward and then is bent inward to form the bending portion 162. Specifically, a free end of the first arc portion 161 is arched outward to form the bending portion 162. The bending portion 162 is positioned in a corresponding region of the housing 2. The bending portion 162 is used to reduce risks of a plastic deformation and a fracture of the elastic arm 16, thereby a usage lifespan of the elastic arm 16 is increased. One end of the bending portion 162 extends outward and along the circumferential direction of the push button 1 to form the second arc portion 163. A free end of the bending portion 162 extends outward and along the circumferential direction of the push button 1 to form the second arc portion 163. The second arc portion 163 is disposed opposite to the first arc portion 161. Each elastic arm 16 is formed between two adjacent projection parts 15. In the present invention, the one side of the projection part 15 is connected with the first arc portion 161 of one elastic arm 16, and the other side of the projection part 15 is close to and is spaced from the second arc portion 163 of another elastic arm 16. The second arc portion 163 abuts against a corresponding segment of the housing 2.

When each pressing area 141 in one direction of the directional pad 14 is pressed, the corresponding projection part 15, and the first arc portion 161, the bending portion 162 and the second arc portion 163 of the corresponding elastic arm 16 move downward.

Meanwhile, the projection part 15, the first arc portion 161 and the bending portion 162 in an opposite direction which is opposite to the pressed pressing area 141 move upward, and the second arc portion 163 in the opposite direction abuts against the corresponding segment of the housing 2. Thus, the button structure 100 has the excellent hand feeling and the better tactile feedback.

The inner wall 13 is shown as an annular shape. The inner wall 13 has the plurality of the connection sections 17. Several portions of the inner wall 13 protrude inward, and then extend upward and downward to form the plurality of the connection sections 17. Each connection section 17 extends along a radial direction of the inner wall 13. The plurality of the connection sections 17 are evenly distributed to an inner periphery of the inner wall 13 along a peripheral direction of the inner wall 13. The inner wall 13 has four connection sections 17. The four connection sections 17 are arranged corresponding to the four directions of the directional pad 14. The four connection sections 17 are corresponding to the four pressing areas 141 of the directional pad 14 which are in the four directions, and the four connection sections 17 are connected beneath the four pressing areas 141 of the directional pad 14 which are in the four directions. The plurality of the connection sections 17 are arranged corresponding to the plurality of the projection parts 15. Outer portions of bottoms of the plurality of the connection sections 17 are connected to inner portions of the plurality of the projection parts 15. Tops of the plurality of the connection sections 17 are connected to inner surfaces of the four pressing areas 141 of the directional pad 14 which are in the four directions. The bottoms of the plurality of the connection sections 17 are arranged corresponding to the metal button 41 on the circuit board 4.

When each pressing area 141 of the directional pad 14 in the one direction is pressed downward, the bottom of the corresponding connection section 17 presses downward on the metal button 41 of the circuit board 4. When the directional pad 14 is released, the corresponding connection section 17 moves upward and returns to an original position of the corresponding connection section 17 due to an elastic restoring force of the corresponding elastic arm 16. Thereby, the metal button 41 of the circuit board 4 also rebounds to an original position of the metal button 41.

Referring to FIG. 3 to FIG. 6, the housing 2 has a top board 21, a lateral wall 22, a plurality of first retaining walls 23, a plurality of second retaining walls 24, a plurality of first bays 25, a plurality of second bays 26 and a plurality of stopping blocks 27. Several portions of a bottom surface of the top board 21 extend downward to form the plurality of the stopping blocks 27. The second arc portions 163 of the plurality of the elastic arms 16 of the push button 1 abut against bottom surfaces of the plurality of the stopping blocks 27.

The lateral wall 22 is connected to an outer periphery of the top board 21. Several portions of a bottom of the lateral wall 22 extend downward to form the plurality of the first retaining walls 23 and the plurality of the second retaining walls 24. The plurality of the first retaining walls 23 are arranged corresponding to the first arc portions 161 of the plurality of the elastic arms 16 of the push button 1. The first arc portions 161 of the plurality of the elastic arms 16 are positioned to inner surfaces of the plurality of the first retaining walls 23. The plurality of the second retaining walls 24 are arranged corresponding to the second arc portions 163 of the plurality of the elastic arms 16 of the push button 1. The second arc portions 163 of the plurality of the elastic arms 16 are positioned to inner surfaces of the plurality of the second retaining walls 24. The plurality of the second retaining walls 24 are arranged corresponding to the plurality of the stopping blocks 27. The inner surfaces of the plurality of the second retaining walls 24 are connected to the plurality of the stopping blocks 27.

In the present invention, the plurality of the first retaining walls 23, the plurality of the second retaining walls 24, the plurality of the first bays 25 and the plurality of the second bays 26 together form four stopping parts 28. Each stopping part 28 includes one first retaining wall 23, one second retaining wall 24, one first bay 25 and one second bay 26. The four stopping parts 28 are arranged corresponding to the four projection parts 15, and the clastic arms 16 which are connected to the four projection parts 15. For each stopping part 28, the first bay 25 is formed between the first retaining wall 23 and the second retaining wall 24. Each second bay 26 is formed between the first retaining wall 23 and the second retaining wall 24 of two adjacent stopping parts 28.

The plurality of the first bays 25 are formed among the plurality of the first retaining walls 23 and the plurality of the second retaining walls 24. The plurality of the first bays 25 are arranged corresponding to the bending portions 162 of the plurality of the elastic arms 16 of the push button 1, and the bending portions 162 of the plurality of the elastic arms 16 are positioned in the plurality of the first bays 25. The plurality of the second bays 26 are formed among the plurality of the first retaining walls 23 and the plurality of the second retaining walls 24. The plurality of the second bays 26 are arranged corresponding to the plurality of the projection parts 15 of the push button 1, and the plurality of the projection parts 15 are positioned in the plurality of the second bays 26. The plurality of the first retaining walls 23, the plurality of the second retaining walls 24, the plurality of the first bays 25 and the plurality of the second bays 26 together form the lateral wall 22.

When each pressing area 141 in the one direction of the directional pad 14 of the push button 1 is pressed downward, the corresponding projection part 15, and the first arc portion 161, the bending portion 162 and the second arc portion 163 of the corresponding elastic arm 16 all move downward. Meanwhile, the projection part 15, the first arc portion 161 and the bending portion 162 in the opposite direction which is opposite to the pressed pressing area 141 move upward, and the second arc portion 163 in the opposite direction abuts against a lower end of the stopping block 27 which is corresponding to the second arc portion 163 in the opposite direction. Thus, the button structure 100 has the excellent tactile feedback.

Referring to FIG. 7 to FIG. 10, the supporting unit 3 according to a first preferred embodiment of the present invention is shown. The supporting unit 3 has a main body 31, a fixing rod 32, two side arms 33 and a positioning groove 34. The main body 31 is positioned on the upper surface of the circuit board 4. A bottom surface of the main body 31 is positioned on the upper surface of the circuit board 4. A middle of the main body 31 extends downward to form the fixing rod 32. The fixing rod 32 extends beyond the bottom surface of the main body 31. The fixing rod 32 penetrates through the circuit board 4, and the fixing rod 32 extends beyond a lower surface of the circuit board 4. Two opposite sides of the main body 31 extend outward to form the two side arms 33, respectively. The two side arms 33 of the supporting unit 3 are shown as Z shapes. The two side arms 33 are positioned on the upper surface of the circuit board 4. During an assembling process of the supporting unit 3, the two side arms 33 are deformed upward to avoid the two side arms 33 from abrading the circuit board 4. A middle of a top surface of the main body 31 is recessed downward to form the positioning groove 34. The positioning groove 34 is arranged corresponding to the protruding column 18 of the push button 1. The protruding column 18 of the push button 1 is positioned in the positioning groove 34.

The main body 31 has a top part 310, two side walls 311 extended downward from two opposite sides of the top part 310, two connection walls 312, two openings 313 and two stiffeners 314. The fixing rod 32 is extended downward from a middle of a bottom surface of the top part 310. The two side arms 33 are extended outward from two middles of two outer surfaces of the two side walls 311, respectively. The main body 31 is a hollow columnar structure. The top part 310 is shown as a hexagonal shape. In a concrete implementation, the main body 31 is without being limited to be the hollow columnar structure, and the top part 310 is without being limited to be the hexagonal shape. In this first preferred embodiment, the two opposite sides of the top part 310 extend downward to form the two side walls 311. The two middles of the two outer surfaces of the two side walls 311 extend outward to form the two side arms 33, respectively. The two connection walls 312 are arranged between the two side walls 311, and the two connection walls 312 are connected between the two side walls 311. The main body 31 has the two openings 313 penetrating through two inner surfaces and two outer surfaces of the two connection walls 312 and the bottom surface of the main body 31. The two openings 313 are used to increase an elasticity of the supporting unit 3. The two inner surfaces of the two side walls 311 extend inward to form the two stiffeners 314. The two stiffeners 314 are connected to the fixing rod 32, and the two stiffeners 314 are arranged corresponding to the two side arms 33. The two stiffeners 314 are used to enhance a structural strength of the supporting unit 3.

The fixing rod 32 has a fixing portion 321 extended downward from the bottom surface of the top part 310, two first extension portions 322 extended downward from a bottom surface of the fixing portion 321, two second extension portions 323, a plurality of slits 324, a plurality of tabs 325 and two buckling hooks 326. A front and a rear of a lower portion of an outer surface of the fixing rod 32 protrude outward to form the two buckling hooks 326. A middle of the bottom surface of the top part 310 of the main body 31 extends downward to form the fixing portion 321. The fixing portion 321 is a hollow columnar shape. Several portions of a periphery of the bottom surface of the fixing portion 321 extend downward to form two first extension portions 322 and two second extension portions 323. The two first extension portions 322 are separated from each other. The two second extension portions 323 are separated from each other. The two first extension portions 322 are arranged corresponding to the two openings 313 of the main body 31. The two second extension portions 323 are arranged corresponding to the two stiffeners 314 of the main body 31, and the two second extension portions 323 are connected to the two stiffeners 314 of the main body 31. The two second extension portions 323 are also arranged corresponding to the two side arms 33. Bottoms of the two first extension portions 322 and the two second extension portions 323 pass through the circuit board 4. The bottoms of the two first extension portions 322 and the two second extension portions 323 extend beyond the lower surface of the circuit board 4.

The two first extension portions 322 are parallel to each other, and the two second extension portions 323 are parallel to each other. The two first extension portions 322 and the two second extension portions 323 are spaced from one another. The two first extension portions 322 are opposite to each other. The two second extension portions 323 are opposite to each other. Each slit 324 is formed between one first extension portion 322 and one second extension portion 323 which are adjacent to each other. The plurality of the slits 324 provide avoiding spaces for elastic deformations of the two first extension portions 322 and two second extension portions 323 to prevent the fixing rod 32 from abrading the circuit board 4. Middles of outer surfaces of the two first extension portions 322 and the two second extension portions 323 extend outward to form the plurality of the tabs 325. The tabs 325 of the two second extension portions 323 are connected to the stiffeners 314 of the main body 31. The tabs 325 of the two first extension portions 322 and the two second extension portions 323 are used to increase the elasticity of the supporting unit 3. The two buckling hooks 326 are extended outward from outer surfaces of the bottoms of the two first extension portions 322. Two bottoms of the two outer surfaces of the two first extension portions 322 extend outward to form the two buckling hooks 326. The buckling hook 326 and the tab 325 of each first extension portion 322 are connected with each other. The two buckling hooks 326 of the two first extension portions 322 are positioned to the lower surface of the circuit board 4. The two buckling hooks 326 of the two first extension portions 322 hook the lower surface of the circuit board 4.

Each side arm 33 has an extension arm 331, a bending arm 332, a fixing end 333 and a positioning bump 334. The middle of the outer surface of each side wall 311 of the main body 31 horizontally extends outward to form the extension arm 331. An outer end of the extension arm 331 is bent downward to form the bending arm 332. A lower end of the bending arm 332 horizontally extends outward to form the fixing end 333. The fixing end 333 is fixed to the upper surface of the circuit board 4. A bottom surface of the fixing end 333 extends downward to form the positioning bump 334. In another word, an upper portion of the fixing end 333 is recessed downward to form the positioning bump 334 protruding beyond the bottom surface of the fixing end 333. The positioning bump 334 is fixed to a corresponding zone of the circuit board 4 to realize that the supporting unit 3 is located to the circuit board 4, and the supporting unit 3 is fixed to the circuit board 4.

The two side walls 311 of the main body 31 are symmetrical, the two connection walls 312 of the main body 31 are symmetrical, the two openings 313 of the main body 31 are symmetrical, the two first extension portions 322 of the fixing rod 32 are symmetrical, the two second extension portions 323 of the fixing rod 32 are symmetrical, and the two side arms 33 are symmetrical to facilitate an automatic assembling operation.

In the first preferred embodiment, an inside of the supporting unit 3 forms an inner space 35 that penetrates through the lower surface of the supporting unit 3. The inner space 35 is enclosed by the top part 310, the two side walls 311 and the two connection walls 312. The fixing rod 32 extends downward to project out of the inner space 35. The bottoms of the two first extension portions 322 project out of the inner space 35, and the bottoms of the two second extension portions 323 project out of the inner space 35.

Referring to FIG. 2 to FIG. 10, the circuit board 4 has the metal button 41, a through hole 42 and two positioning holes 43. The metal button 41 is located on the upper surface of the circuit board 4. The through hole 42 penetrates through the upper surface and the lower surface of the circuit board 4. The through hole 42 is corresponding to the fixing rod 32 of the supporting unit 3. The fixing rod 32 of the supporting unit 3 passes through the through hole 42. The bottoms of the two first extension portions 322 and two second extension portions 323 pass through the through hole 42. The two buckling hooks 326 pass through the through hole 42. The two buckling hooks 326 are buckled to the lower surface of the circuit board 4. The circuit board 4 has the two positioning holes 43 penetrating through the upper surface and the lower surface of the circuit board 4. The through hole 42 is located between the two positioning holes 43. The two positioning holes 43 are corresponding to the two positioning bumps 334 of the two side arms 33. Two bottom surfaces of the two side arms 33 are positioned on the upper surface of the circuit board 4. The two positioning bumps 334 of the two side arms 33 are positioned in the two positioning holes 43.

The top part 310 is mounted to the upper surface of the circuit board 4. The push button 1, the two side walls 311, the two connection walls 312 and the two side arms 33 are positioned on the upper surface of the circuit board 4. The circuit board 4 is fastened among the bottom surface of the main body 31, the bottom surfaces of the two side arms 33 and the top surfaces of the two buckling hooks 326 of the supporting unit 3. The circuit board 4 is fastened among bottom surfaces of the two side walls 311 of the main body 31, bottom surfaces of the two side arms 33 and top surfaces of the two buckling hooks 326 of the supporting unit 3, so that a location between the circuit board 4 and the supporting unit 3 and a fixation between the circuit board 4 and the supporting unit 3 are realized, and a sway of the circuit board 4 is prevented. During a process of assembling the supporting unit 3 and the circuit board 4, the two buckling hooks 326 are deformed outward after the two buckling hooks 326 pass through the through hole 42, so that the two buckling hooks 326 are prevented from abrading the circuit board 4.

Figure 11:
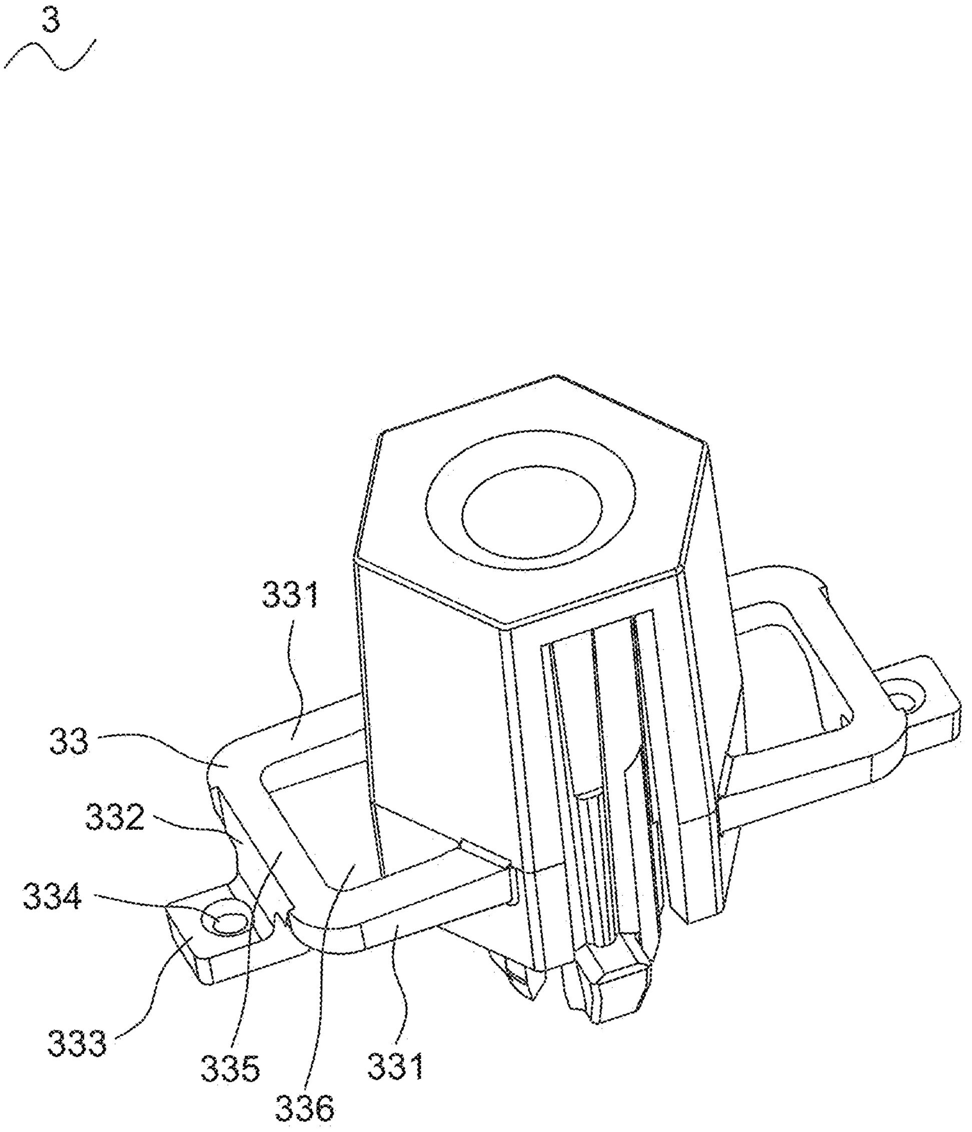
FIG. 11 is a perspective view of the supporting unit of the button structure in accordance with a second preferred embodiment of the present invention.

Referring to FIG. 2 and FIG. 11, the supporting unit 3 of the button structure 100 in accordance with a second preferred embodiment of the present invention is shown.

Differences between the button structure 100 according to the second preferred embodiment and the button structure 100 according to the first preferred embodiment are described as follows. A difference between the supporting unit 3 according to the second preferred embodiment and the supporting unit 3 according the first preferred embodiment is mainly in shapes of the two side arms 33 of the supporting unit 3. In the second preferred embodiment, two ends of the outer surface of each side wall 311 of the main body 31 extend outward to form two extension arms 331. A connection arm 335 is connected between two outer ends of the two extension arms 331. An outer surface of the connection arm 335 is bent downward to form the bending arm 332. An outer end of the bending arm 332 extends outward to form the fixing end 333. The fixing end 333 is fixed to the upper surface of the circuit board 4. The upper portion of the fixing end 333 is recessed downward to form the positioning bump 334 protruding beyond the bottom surface of the fixing end 333. The two positioning bumps 334 of the two side arms 33 are positioned in the two positioning holes 43. A hollow area 336 is formed among the two extension arms 331 and the connection arm 335 of each side wall 311 of the main body 31. The two hollow areas 336 of the main body 31 enhances the elasticity of the two side arms 33 to facilitate a manual assembling operation.

As described above, the main body 31 is positioned on the upper surface of the circuit board 4, the two first extension portions 322 and the two second extension portions 323 pass through the through hole 42, the two buckling hooks 326 pass through the through hole 42, the two buckling hooks 326 are buckled to the lower surface of the circuit board 4, the two positioning bumps 334 of the two side arms 33 are positioned in the two positioning holes 43, and the circuit board 4 is fastened among the bottom surfaces of the two side walls 311 of the main body 31, the bottom surfaces of the two side arms 33 and the top surfaces of the two buckling hooks 326, so the button structure 100 prevents the circuit board 4 from shaking. Furthermore, the two side walls 311 of the main body 31 are symmetrical, the two connection walls 312 of the main body 31 are symmetrical, the two openings 313 of the main body 31 are symmetrical, the two first extension portions 322 of the fixing rod 32 are symmetrical, the two second extension portions 323 of the fixing rod 32 are symmetrical, and the two side arms 33 are symmetrical to facilitate the automatic assembling operation. In addition, the hollow area 336 is formed among the two extension arms 331 and the connection arm 335 of each side wall 311 of the main body 31, and the two hollow areas 336 of the main body 31 enhances the elasticity of the two side arms 33 to facilitate the manual assembling operation. As a result, the button structure 100 is conveniently assembled automatically and manually, and the button structure 100 is stably assembled and is applied to a game controller.

What is claimed is:

1. A button structure, comprising:
   - a push button having a top wall, a middle of a bottom surface of the top wall of the push button protruding downward to form a protruding column;
   - a supporting unit mounted inside the push button, the supporting unit having a main body, a fixing rod, two side arms and a positioning groove, the main body being a hollow columnar structure, two opposite sides of the main body extending outward to form the two side arms, a middle of the main body extending downward to form the fixing rod, the fixing rod extending beyond a bottom surface of the main body, a front and a rear of a lower portion of an outer surface of the fixing rod protruding outward to form two buckling hooks, a middle of a top surface of the main body being recessed downward to form a positioning groove, the protruding column being positioned in the positioning groove; and
   - a circuit board, the push button being disposed on an upper surface of the circuit board, a bottom surface of the main body being positioned on the upper surface of the circuit board, two bottom surfaces of the two side arms being positioned on the upper surface of the circuit board, the circuit board having a through hole penetrating through the upper surface and a lower surface of the circuit board, the fixing rod passing through the through hole, the two buckling hooks being buckled to the lower surface of the circuit board, the circuit board being fastened among the bottom surface of the main body, the bottom surfaces of the two side arms and top surfaces of the two buckling hooks.

2. The button structure as claimed in claim 1, wherein the main body has a top part, the fixing rod has a fixing portion, a middle of a bottom surface of the top part extends downward to form the fixing portion, several portions of a periphery of a bottom surface of the fixing portion extend downward to form two first extension portions and two second extension portions, bottoms of the two first extension portions and the two second extension portions pass through the through hole.

3. The button structure as claimed in claim 2, wherein two opposite sides of the top part extend downward to form two side walls, two outer surfaces of the two side walls extend outward to form the two side arms, respectively, two connection walls are arranged between the two side walls, and the two connection walls are connected between the two side walls, the main body has two openings penetrating through two inner surfaces and two outer surfaces of the two connection walls and the bottom surface of the main body, the two first extension portions are arranged corresponding to the two openings, two inner surfaces of the two side walls extend inward to form two stiffeners, the two stiffeners are connected to the fixing rod, the two second extension portions are arranged corresponding to the two stiffeners, and the two second extension portions are connected to the two stiffeners, the two stiffeners are arranged corresponding to the two side arms.

4. The button structure as claimed in claim 3, wherein two bottoms of two outer surfaces of the two first extension portions extend outward to form the two buckling hooks, middles of outer surfaces of the two first extension portions and the two second extension portions extend outward to form a plurality of tabs, the buckling hook and the tab of each first extension portion are connected with each other, the tabs of the two second extension portions are connected to the stiffeners of the main body.

5. The button structure as claimed in claim 3, wherein each side arm has an extension arm, a bending arm, a fixing end and a positioning bump, a middle of the outer surface of each side wall horizontally extends outward to form the extension arm, an outer end of the extension arm is bent downward to form the bending arm, a lower end of the bending arm horizontally extends outward to form the fixing end, the fixing end is fixed to the upper surface of the circuit board, the circuit board has two positioning holes penetrating through the upper surface and the lower surface of the circuit board, the through hole is located between the two positioning holes, a bottom surface of the fixing end extends downward to form a positioning bump, the two positioning bumps of the two side arms are positioned in the two positioning holes.

6. The button structure as claimed in claim 3, wherein two ends of the outer surface of each side wall of the main body extend outward to form two extension arms, a connection arm is connected between two outer ends of the two extension arms, an outer surface of the connection arm is bent downward to form a bending arm, an outer end of the bending arm extends outward to form a fixing end, the fixing end is fixed to the upper surface of the circuit board, the circuit board has two positioning holes penetrating through the upper surface and the lower surface of the circuit board, the upper portion of the fixing end is recessed downward to form a positioning bump protruding beyond a bottom surface of the fixing end, the two positioning bumps of the two side arms are positioned in the two positioning holes, a hollow area is formed among the two extension arms and the connection arm of each side wall of the main body.

7. The button structure as claimed in claim 2, wherein the two first extension portions are parallel to each other, and the two second extension portions are parallel to each other, the two first extension portions and the two second extension portions are spaced from one another, the two first extension portions are opposite to each other, the two second extension portions are opposite to each other, each slit is formed between one first extension portion and one second extension portion which are adjacent to each other.

8. The button structure as claimed in claim 2, wherein the fixing portion is a hollow columnar shape.

9. The button structure as claimed in claim 1, wherein the two side arms of the supporting unit are shown as Z shapes.

10. A button structure, comprising:

a push button;

a supporting unit mounted inside the push button, an inside of the supporting unit forming an inner space that penetrates through a lower surface of the supporting unit, the supporting unit having:

a top part;

two side walls extended downward from two opposite sides of the top part;

two connection walls arranged between the two side walls, and the two connection walls connected between the two side walls, the inner space being enclosed by the top part, the two side walls and the two connection walls;

a fixing rod extended downward from a middle of a bottom surface of the top part, the fixing rod extending downward to project out of the inner space, a front and a rear of a lower portion of an outer surface of the fixing rod protruding outward to form two buckling hooks; and two side arms extended outward from two middles of two outer surfaces of the two side walls, respectively, each side arm having an extension arm, a bending arm, a fixing end and a positioning bump, the middle of the outer surface of each side wall horizontally extending outward to form the extension arm, an outer end of the extension arm being bent downward to form the bending arm, a lower end of the bending arm horizontally extending outward to form the fixing end, an upper portion of the fixing end being recessed downward to form a positioning bump protruding beyond a bottom surface of the fixing end; and a circuit board, the top part being mounted to an upper surface of the circuit board, the push button, the two side walls, the two connection walls and the two side arms being positioned on the upper surface of the circuit board, the circuit board having a through hole penetrating through the upper surface and a lower surface of the circuit board, the circuit board having two positioning holes penetrating through the upper surface and the lower surface of the circuit board, the through hole being located between the two positioning holes, the fixing rod passing through the through hole, the two buckling hooks being buckled to the lower surface of the circuit board, the circuit board being fastened among bottom surfaces of the two side walls, bottom surfaces of the two side arms and top surfaces of the two buckling hooks, the two positioning bumps of the two side arms being positioned in the two positioning holes.

11. A button structure, comprising:

a push button;

a supporting unit mounted inside the push button, an inside of the supporting unit forming an inner space that penetrates through a lower surface of the supporting unit, the supporting unit having:

a top part;

two side walls extended downward from two opposite sides of the top part;

two connection walls arranged between the two side walls, and the two connection walls connected between the two side walls;

a fixing portion extended downward from a bottom surface of the top part;

two first extension portions extended downward from a bottom surface of the fixing portion, the two first extension portions being separated from each other, bottoms of the two first extension portions projecting out of the inner space;

two buckling hooks extended outward from outer surfaces of the bottoms of the two first extension portions; and two side arms extended outward from two outer surfaces of the two side walls, respectively; and a circuit board, the top part being mounted to an upper surface of the circuit board, the push button, the two side walls, the two connection walls and the two side arms being positioned on the upper surface of the circuit board, the circuit board having a through hole penetrating through the upper surface and a lower surface of the circuit board, the bottoms of the two first extension portions passing through the through hole, the two buckling hooks passing through the through hole, the two buckling hooks being buckled to the lower surface of the circuit board, the circuit board being fastened among bottom surfaces of the two side walls, bottom surfaces of the two side arms and top surfaces of the two buckling hooks.

* * * * *